(12) United States Patent
Cook et al.

(10) Patent No.: US 6,896,074 B2
(45) Date of Patent: May 24, 2005

(54) SYSTEM AND METHOD FOR INSTALLATION AND USE OF DEVICES IN MICROBOREHOLES

(75) Inventors: John Mervyn Cook, Cambridge (GB); Iain Cooper, Linton (GB); Benjamin Peter Jeffryes, Histon (GB); Richard Timothy Coates, Bethel, CT (US); William Li-Tien Wang, Cambridge (GB); Paul Hammond, Bourn (GB); Philip Christie, Fen Drayton (GB); David Nichols, Cambridge (GB); Paul Bolchover, Cambridge (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 113 days.

(21) Appl. No.: 10/267,487

(22) Filed: Oct. 9, 2002

(65) Prior Publication Data

US 2004/0069487 A1 Apr. 15, 2004

(51) Int. Cl.$^7$ ............................................... E21B 47/01
(52) U.S. Cl. ...................... 175/50; 175/48; 166/250.07; 166/250.11; 166/250.17
(58) Field of Search ............................. 175/40, 48, 50; 166/250.01, 250.02–250.09, 250.11, 250.13, 250.17

(56) References Cited

U.S. PATENT DOCUMENTS

| | | | |
|---|---|---|---|
| 4,167,111 A | | 9/1979 | Spuck, III |
| 4,226,288 A | | 10/1980 | Collins, Jr. |
| 5,096,001 A | * | 3/1992 | Buytaert et al. ............... 175/40 |
| 5,692,565 A | | 12/1997 | MacDougall et al. |
| 5,926,437 A | * | 7/1999 | Ortiz ........................... 367/35 |
| 6,167,968 B1 | | 1/2001 | Allarie et al. |
| 6,234,257 B1 | | 5/2001 | Ciglenec et al. |
| 6,265,713 B1 | | 7/2001 | Berard et al. |
| 6,378,629 B1 | | 4/2002 | Baird |
| 6,389,908 B1 | | 5/2002 | Chevalier et al. |

FOREIGN PATENT DOCUMENTS

| | | |
|---|---|---|
| GB | 2 355 477 | 4/2001 |
| WO | 98/50673 A1 | 11/1998 |

OTHER PUBLICATIONS

K A Burgess, T D MacDougall, R W Siegried, T G Fields, Wireline–Conveyed Through–Casing Formation Tester Preserves Casing Integrity, SPE 72371, Oct. 17–19, 2001.

Cased Hole Dynamics Tester Brochure 2000, http://www.connect.slb.com/Hub/brochure/brochure.cfm?printable=1&b=connect/formation_evaluation/Cased_Hole_Dynamics_Tester&id=id670409&bList=brochure01,brochure02,brochure03,brochure04,brochure05&n=1.

J N Albright, D S Dreesden, Microboreholes—1, Microhole technology lowers reservoir exploration, characterization costs, Oil and Gas Journal, Jan. 10, 2000, (39–41).

D S Dreesen, J N Albright, Microboreholes—Conclusion, Models support potential for drilling deep microholes, Oil and Gas Journal, Jan. 17, 2000. (56–61).

(Continued)

Primary Examiner—Zakiya Walker
(74) Attorney, Agent, or Firm—William L. Wang; Tim W. Curington; William B. Batzer (57) ABSTRACT

The present invention provides methods and systems for making measurements associated with a rock formation including a main borehole, a microborehole extending from the main borehole into the rock formation, and one or more sensing devices positioned and arranged to make a measurement at measurement zones being located in the microborehole. A packer can also be installed in the microborehole dimensioned and arranged to hydraulically isolate the measurement zones from conditions present in other parts of the microborehole and/or main borehole. Methods and systems are also provided for taking fluid samples and injecting fluid tracers in a microborehole.

19 Claims, 4 Drawing Sheets

OTHER PUBLICATIONS

D R Turner, T W R Harris, M Slater, M A Yuratich, P F Head, Electric Coiled Tubing Drilling: A Smarter CT Drilling System, SPE/IADC 52791 Mar. 9–11, 1999.

P Head, M Yuratich, T Hanson, Electric Coiled Tubing Drilling (E–CTD) Project Update, SPE 68441, Mar. 7–8, 2001.

Acoustic Borehole Televiewer Tool, Ultrasonic Imaging System for Slimhole Logging, http://www.tpd.tno.nl/smart-site.html?id=251, Oct. 8, 2002 or earlier.

RST Instruments Ltd: Rod type multiple point borehole extensometers (MPBX), http://www.rstinstruments.com/proddesc/desc_EXTN_MPBX.htm., Oct. 8, 2002 or earlier.

RST Instruments Ltd: ELS In–Place Tiltmeters, http://www.rstinstruments.com/proddesc/desc_INCL_TiltMeter.htm., Oct. 8, 2002 or earlier.

* cited by examiner

SYSTEM AND METHOD FOR INSTALLATION AND USE OF DEVICES IN MICROBOREHOLES

FIELD OF THE INVENTION

The present invention relates to the field of boreholes oilfield services applications. In particular, the invention relates to methods and systems which are used in microboreholes or microlaterals opened from a main wellbore.

BACKGROUND OF THE INVENTION

Drilling secondary holes from a main borehole is an established technology, for example in creating sidetracks and multilateral wells for formation evaluation or production enhancement. These multilaterals have diameters comparable to the parent borehole. Because of the stiffness of the assembly used to drill them, they take off from the parent hole at a shallow angle, leaving a large elliptical opening at the junction. If the junction needs to be sealed, this requires a considerable investment in a mechanical junction of some kind, over and above the investment of time and money required to drill the multilateral hole in the first place.

Because of this, a multilateral well is typically drilled for production enhancement or control of some kind, when access to a part of the reservoir far from the main borehole is needed. The technology for accessing the reservoir close to the main borehole is also very well established, namely shaped charge perforators. These open channels into the formation, through the casing and cement, to allow the flow of hydrocarbons into the well or treatment fluids into the formation. The holes in the casing created by shaped charges are not smoothly shaped, but are ragged or rough; this makes them difficult to seal, should this be required. The holes created in the rock are also not smooth, clean or uniformly shaped; they are tapered, have a rough wall, and contain debris, and their dimensions depend on rock strength and many other factors.

Due in large part to the aforesaid characteristics, multilateral holes and shaped charge holes are not suitable for a number of uses which would benefit from the access to the rock formation surrounding the main well bore.

SUMMARY OF THE INVENTION

Thus, it is an object of the present invention to provide a system and method for installing and using devices in microboreholes.

According to the invention a system is provided for making measurements associated with a rock formation comprising a main borehole, a microborehole extending from the main borehole into the rock formation, a sensing device positioned and arranged to make a measurement at a measurement zone being located in the microborehole away from the main borehole by a distance of at least the diameter of the main borehole, and a packer installed in the microborehole dimensioned and arranged to hydraulically isolate the measurement zone from conditions present in other parts of the microborehole and/or main borehole.

According to various embodiments of the invention, the sensing device can be one or more pressure sensors, including sensors for pore pressure in shale formations, a water or gas detector, an electrical sensor to detect electroseismic activity, a temperature sensor, or a chemical sensor.

According to another embodiment of the invention a system is provided for making measurements associated with a rock formation comprising a main borehole, a microborehole extending from the main borehole into the rock formation, and a sensing device at least part of which is positioned in the microborehole away from the main borehole by a distance at least the diameter of the main borehole.

According to various embodiments, the sensing device can be a tilt meter, a geophone, a magnetometer, or a sensor adapted to detect compaction of the rock formation.

According to various other embodiments of the invention, multiple measurements can be made along the length of the microborehole using the sensing device. This can be accomplished using multiple sensors placed at different locations in the microborehole, or by moving the sensing device along the microborehole while making measurements. The sensing device can be a resistivity meter or an ultrasonic imaging device.

According to another embodiment of the invention a sampling device is positioned and arranged to take a fluid sample at a sampling zone being located in the microborehole away from the main borehole by a distance of at least the diameter of the main borehole.

According to another embodiment of the invention an injection device is positioned and arranged to inject a tracer at an injection zone being located in the microborehole away from the main borehole by a distance of at least the diameter of the main borehole.

The invention is also embodied in a method of installing a sensor in a microborehole, and a method for making measurements associated with a rock formation in a microborehole.

As used herein the term microlaterals and microboreholes means any holes bored from a main borehole having a diameter substantially less than that of the main borehole and a length longer then the diameter of the main borehole. Typically microlateral and microboreholes are approximately or nearly perpendicular to the main borehole, around 15–50 mm diameter and 2–3 meters long.

DETAILED DESCRIPTION OF THE INVENTION

According to the invention, creating a relatively smooth hole through the casing and formation, with a known size, allows emplacement of sensors or other devices, followed by sealing of the hole in the casing to give isolation of the sensor from the contents of the wellbore. This can be done, for example, by Schlumberger's Cased Hole Dynamics Tester, mounted on the MDT platform on wireline. See U.S. Pat. No. 5,692,565, hereby incorporated herein by reference. See also, "Wireline-Conveyed Through-Casing Formation Tester Preserves Casing Integrity" by Burgess et al., Society of Petroleum Engineers, SPE 72371.

With this type of arrangement, the maximum depth of the hole is currently limited to around 150 mm. This depth allows fluid sampling or a valid measurement of formation fluid pressure in a permeable formation from a cased well. However, some types of measurements in a hole of this depth would be compromised by the proximity of the main borehole. For example, formation temperature will be strongly influenced by the history of fluid circulation in the main borehole; and stresses and mechanical properties are perturbed by the stress concentration around the main borehole.

According to the invention, in order to make measurements unperturbed by the presence of the main borehole, sensors should be placed much further away from it; ideally between 5 and 10 wellbore diameters. Small holes, 2 to 3 meters long and 2 to 3 centimeters in diameter, perpendicular to the main borehole, allow the placement of many different types of devices, for sensing, injecting, generating signals, etc., as well as other functions.

A technology such as that provided by the tool known as Penedrill, from Penetrators Canada, in Red Deer, Alberta is preferred according to a preferred embodiment of the invention. The penedrill system is described in U.S. Pat. No. 6,167,968, hereby incorporated herein by reference. The Penedrill tool is preferably mounted on jointed or coiled tubing, and drills a hole through the casing with a drill bit designed for metal, then uses an internal shuttle to move a rock drilling assembly into place. Such an arrangement can then drill up to 2 meters into the formation at right angles to the main borehole. The drilling and assembly changeover are preferably controlled and powered hydraulically from the surface, and a drilling operation may take between 3 and 20 minutes. Around ten holes can be drilled in a single trip.

Figure 1:
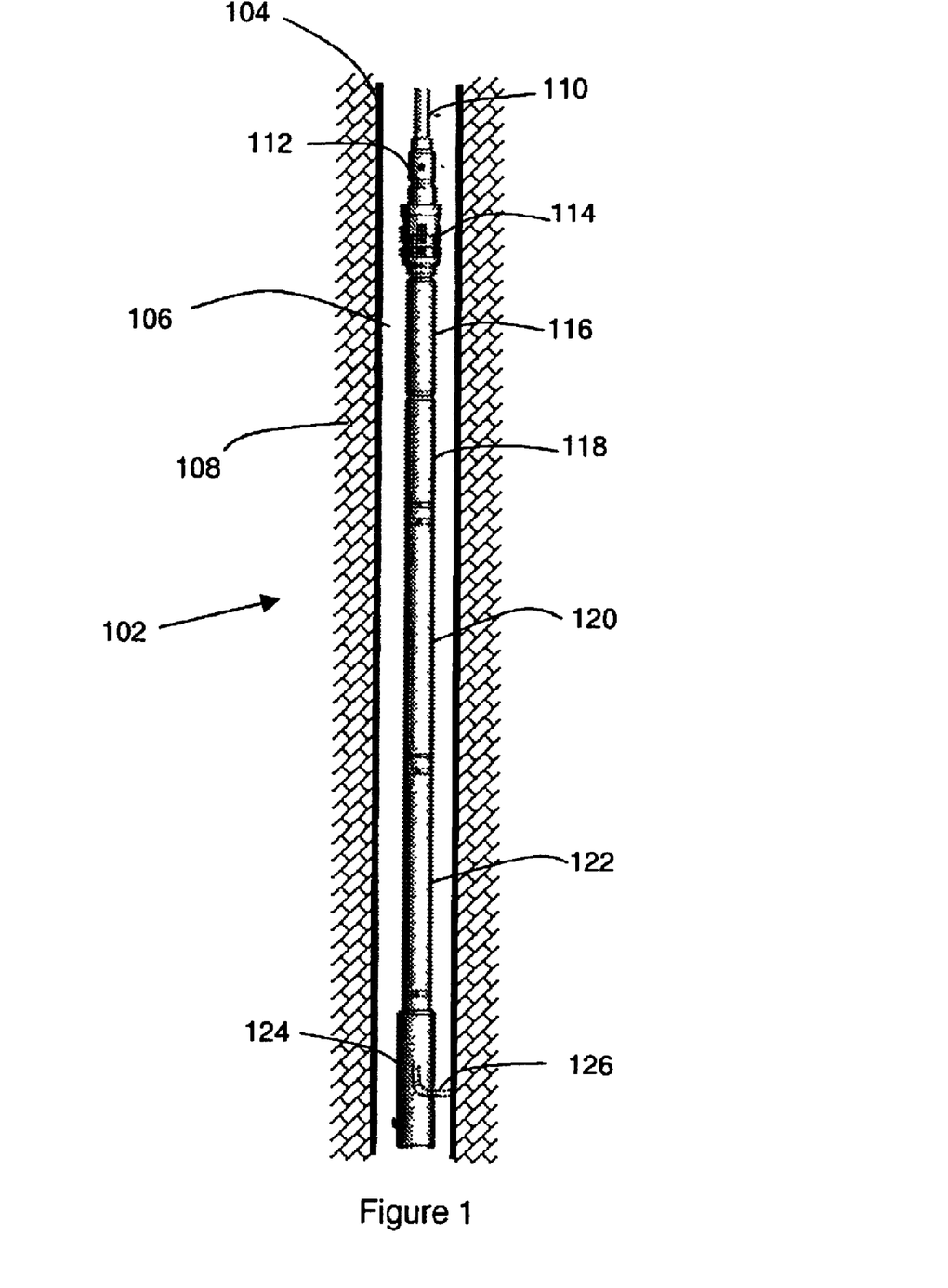
FIG. 1 shows a schematic of tool suitable for use with the present invention.

FIG. 1 shows a schematic of a tool suitable for use with the present invention, such as the Penedrill tool. Tool 102 is shown deployed in a wellbore in rock formation 108 and cased with casing 104.

The tool 102 according a preferred embodiment of the invention is approximately 30 feet long and approximately 4" outer diameter. With such dimensions, the tool would be suitable where the main well bore, or casing, is between 4.5" and 7" in diameter. The tool is preferably modified to larger diameter for larger casing or hole sizes.

The tool 102 is supported by tubing 110. Tubing 110 can be either jointed or coiled tubing. Anchor 114 is used to fix the position of the tool during the microborehole drilling operation. Filter 116 is provided for protection of the tool from unwanted particulate matter in the hydraulic line.

Control section 116 is a hydraulically actuated valve assembly allowing actuation of the tools by the operator at the surface. Fluid is returned to the surface via tubing/casing annulus 106. The maximum tubing pressure is preferably about 26 Mpa (3770 psi).

Motor section 120 and drill section 122 develop the rotation, extension and retraction used for drilling the microborehole. The drill bit within drill section 122 is preferably a diamond rock bit and drills microboreholes of about 17 mm in diameter.

Mill section 124 mills a hole in the production casing (if present) and allows the drill bit to access the rock formation. A shift sequence is preferably performed hydraulically. For a 17 mm microborehole the casing hole window should be about 26 mm. Mill section 124 includes the tool deployment channel 126 through which the drilling tool and other equipment and devices are inserted into the rock formation.

Another type of device which could also be used for drilling through the casing for use with some embodiments of the present invention is described in U.S. Pat. No. 6,378,629, hereby incorporated herein by reference. The technique is disclosed by Saturn Machine and Welding Co. of Kentucky.

Los Alamos National Labs have disclosed a technique for acoustic sensor or source placement in small diameter boreholes drilled directly from the surface. See, Albright, J. N. and Dreesen, D. S., "Microhole technology lowers reservoir exploration, characterization costs", Oil and Gas Journal special issue, Jan. 10, 2000, p. 39; "Models support potential for drilling deep microholes", Oil and Gas Journal, Jan. 17, 2000, p. 56.

Figure 2:
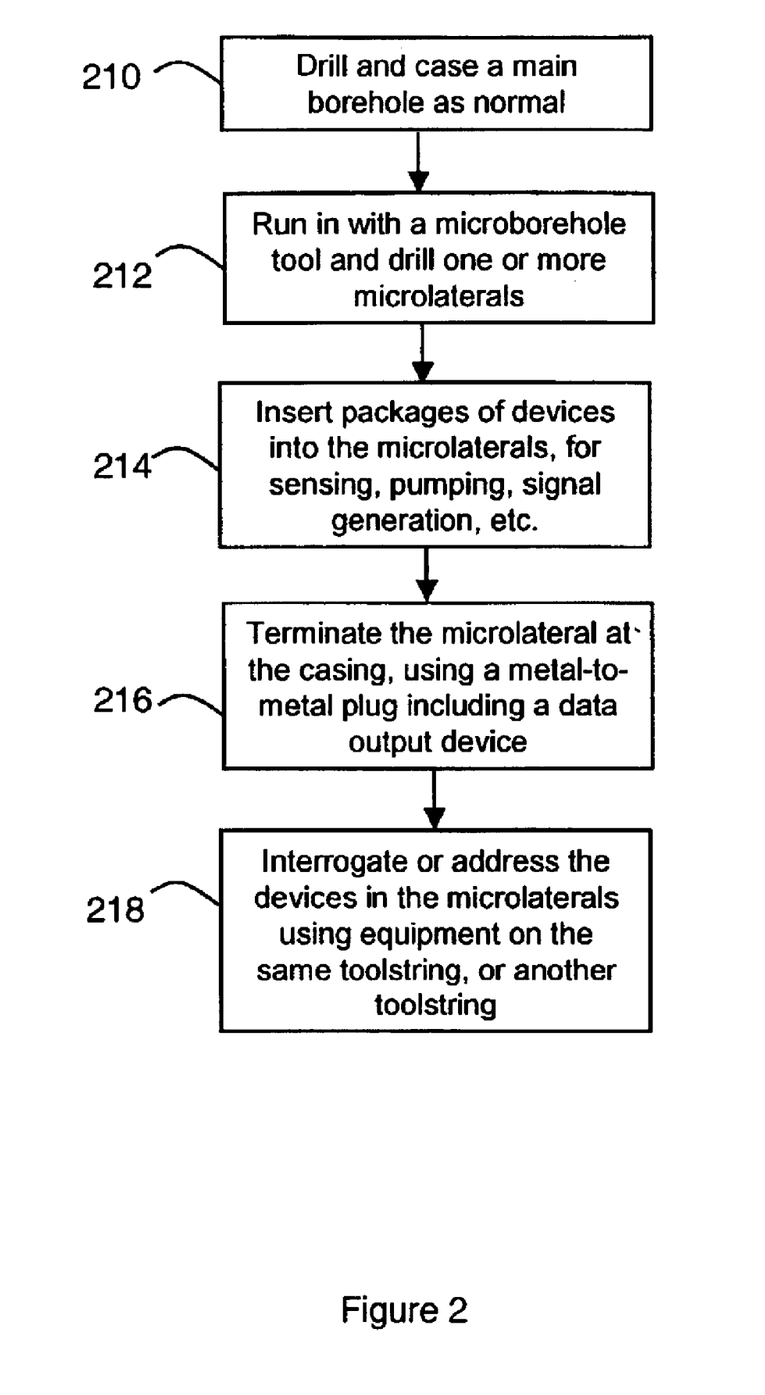
FIG. 2 shows steps for making use of microboreholes according to several preferred embodiments of the invention.

FIG. 2 shows steps for making use of microboreholes according to several preferred embodiments of the invention. As shown in FIG. 2, in step 210, the main borehole is drilled and cased using conventional technology. In step 212 a specialized tool for drilling microboreholes is run into the well. For example a tool such as the Penedrill tool can be used in this step to drill one or more microlaterals. The tool is preferably run as a stand-alone tool on the end of coiled or jointed tubing, however the tool could also be provided as part of the main bottom hole assembly and performed while-drilling. If a while-drilling arrangement was used, the main drillstring would be stationary for some time during steps 212.

In step 214 packages of devices are inserted into the microlaterals, depending upon the specific desired application (e.g. sensing, pumping, signal generation).

In step 216 the hole is terminated at the casing, preferably using a metal-to-metal plug with some form of data output device. The plug is preferably such as that used with Schlumberger's Cased Hole Drilling Tool. See, SPE 72371.

In step 218 the devices installed in the microlaterals in step 214 are interrogated or addressed using suitable downhole equipment. The equipment used for the interrogation and/or addressing is on the same toolstring, or another toolstring. Interrogation systems that could be used for this step include that disclosed in U.S. Pat. No. 6,234,257, hereby incorporated herein by reference.

Advantageously, the sequence of operations described in FIG. 2 allows permanent installation of devices, in good contact with the formation and situated away from the perturbing influence of the main borehole.

Figure 3:
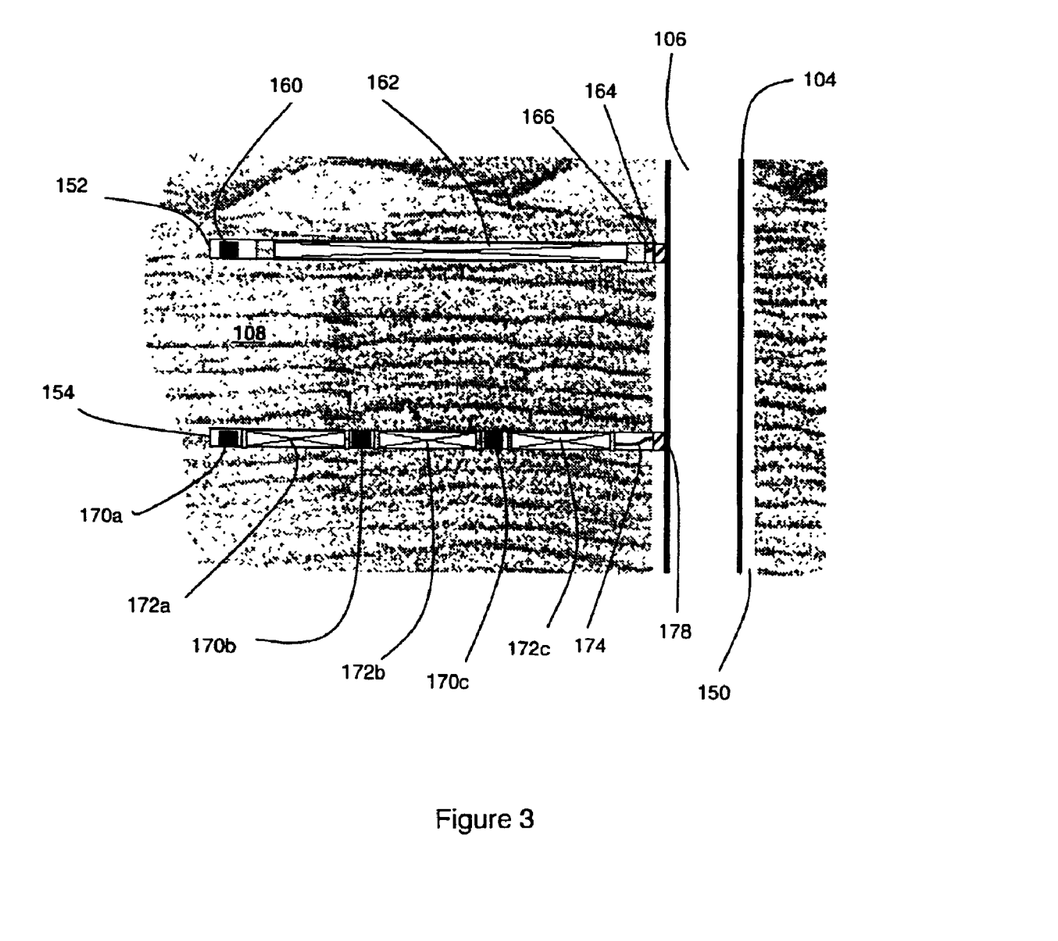
FIG. 3 shows a schematic diagram of two microboreholes extending from a main borehole into a rock formation, according to the invention.

FIG. 3 shows a schematic diagram of two microboreholes 152 and 154 extending from a main borehole 106 into rock formation 108. Main borehole 106 is cased with casing 104 and the annular space between rock formation 108 and casing 104 is filled with cement 150. The microborehole 152 contains a pressure sensor 160 at the far end, and a packer 162 that seals the remainder of the microborehole. The configuration of hole 152 is suitable, for example, for measuring pore pressure in extremely impermeable formations. The microborehole 154 contains three pressure sensors 170a, 170b and 170c isolated by packers 172a, 172b and 172c. This configuration of microborehole 154 would be suitable, for example, for measuring radial pressure gradient in a permeable formation.

Metal to metal seals 164 and 178 are positioned in the openings of casing 104. Seals 164 and 178 serve to protect the cement 150 and the microborehole contents including the packers, wires, sensors and any other devices from the contents of the main borehole contents. For example, the main borehole might by exposed to harsh chemicals from an acid treatment, and the seals 164 and 178 protect the cement and contents of the microboreholes from the acid. Preferable, seals 164 and 178 are provided with a data readout capability to that the data from the devices in the microboreholes can be read by interrogation systems within the main borehole. For example, electrical connectors or inductive coupling could be provided.

Connection wiring 174 and 166 is provided to electrically connect the devices within the microboreholes with the seals 178 and 164 respectively.

The sensor devices should be of a diameter to both fit within the dimensions of the microborehole, and to allow for insertion around the corner from the main borehole to the microborehole. The packers are preferably dimensioned to fit closely in the microborehole, so that packers do not need to have high expansion ratio. The sensor devices, the packers and any other equipment which is installed in the microlateral should be designed and dimensioned to be stiff enough to push down the microborehole, but flexible enough to turn the corner from the main borehole to the microlateral. The equipment being installed and the tools used to provide the insertion should also be designed to be robust enough to survive abrasion against rock during installation system plus downhole conditions of chemistry, temperature and pressure. The control system is preferably designed and adapted to allow for the inflation of packers, setting of casing plug, etc. According to a preferred embodiment, the control system, sensors, packers, and any devices needed to installed the sensor and packers in the microborehole are installed from same tool (tool 102 from FIG. 1) as does the drilling of the microborehole, so that only one trip is needed to install the devices, and so that the precise position of the hole is not lost. The casing plugs or seals 164 or 178 should be on the end of the package being installed in the microborehole, for same reasons.

Figure 4:
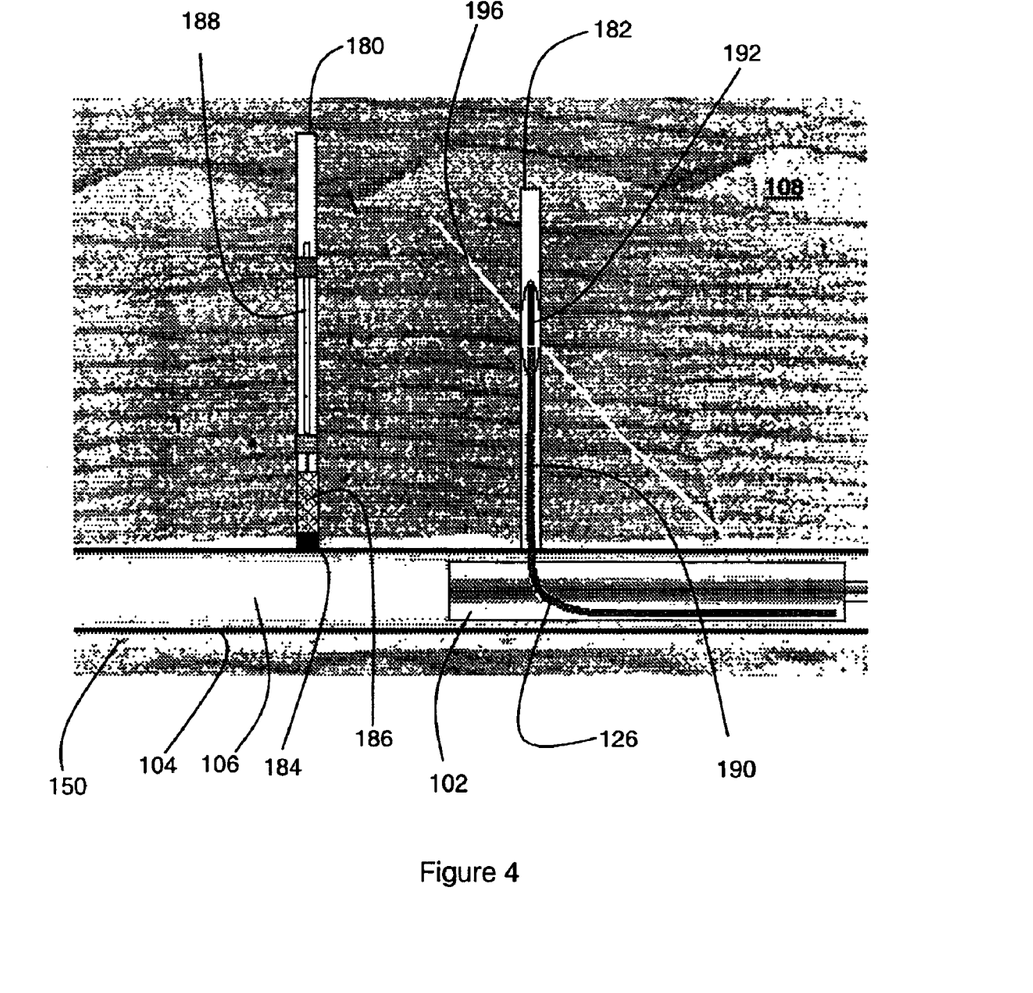
FIG. 4 also shows devices installed in microboreholes extending from a horizontal portion of the main wellbore, according to the invention.

FIG. 4 shows two microboreholes 180 and 182 bored in rock formation 108 from a portion of main borehole 106 that is horizontal. FIG. 4 also shows devices installed in the microboreholes that are not used in conjunction with packers. As will be described in more detail below, according to an embodiment of the invention an extensometer 188 is installed in microborehole 180. Electronics package 186 contains electronics used to make the measurement with the extensometer and convert the measurement to digital form. Metal to metal seal or casing plug 184 provides an adequate seal as described with respect to FIG. 3. The seal 184 also preferably includes a connector for electrical communication with electronics package 186 and a data read out antenna that allows for data to be read out from interrogation equipment in the main borehole 106. The electronics package 186 also preferably includes a memory on which can be stored the measurements from the extensometer over a period of time at least as long as the interval between interrogations from equipment in the main borehole 106. According to an alternative embodiment, a telemetry cable is provided within 106 to allow for the measurement data to be transmitted to the surface directly.

FIG. 4 also shows an ultrasonic imaging tool 192 being positioned in microborehole 182. As described in more detail below, the ultrasonic imaging tool 192 can be used to characterize fractures, such as fracture 196 in rock formation 108. Also shown in the insertion tool body 190 being extended into microborehole 182 through the tool deployment channel 126 of tool 102.

According to various preferred embodiments of the invention, a number of different devices will now be described which make use of microborehole technology. According to a preferred embodiment formation pressure in shale is measured. Placing a pore pressure sensor in a microborehole in a shale formation at distances of 2–3 meters from the main borehole greatly alleviates many of the problems associated with measurements of shale pore pressure close to the main borehole. Examples of such problems include errors from the stress concentration around the main borehole, the effects of temperature variations in the flowing fluid in the main borehole, chemical effects from the drilling fluid, and hydraulic invasion because of pressure differentials. The shale pressure sensor should preferably be small (to give a short response time); remote from the wellbore (to avoid the above perturbations); and installed for a relatively long period of time (to ensure it comes to equilibrium). According to this embodiment as shown in FIG. 3 the shale pressure sensor is sensor 160 in microborehole 152, shown installed at the far end of a microlateral, isolated from the main wellbore by a packer 162 filling the remainder of the microlateral 152 and the plug in the casing 164. Advantageously, this embodiment provides a semi-routine way of measuring formation pressure in shales. Suitable small packers are available in the geotechnical and hydrology industries; for example, IPI, RST, Tam, RocTest and GeoPro, all offer packers down to about 30 mm diameter. Making smaller, flexible packers is not difficult, especially as the differential pressure they need to withstand is very low. Existing small highly accurate pressure sensors can be used, such as conventional or MEMS technology (e.g., Entran, Memscap). Other suitable sensors have been developed for devices such as described in U.S. Pat. No. 6,234,257. The Schlumberger Cased Hole Dynamics Tester drills a short hole through the casing, and has a pressure gauge mounted on the drill assembly. This tool is preferably modified so that the pressure sensor is left in the microborehole when the drill is withdrawn or is installed after drilling.

According to another embodiment, radial pressure gradient is measured. Two or more pressure sensors are installed along a single microlateral, with packers filling the gaps, such as shown in microborehole 154 in FIG. 3. During production, the radial pressure gradient can be established, allowing evaluation of skin, non-Darcy effects, condensate or water banking, etc. These measurements advantageously help in improving the interpretation of well testing data. If permeability is known, radial pressure gradient gives, from Darcy's law, local inflow rate into the well. High-accuracy pressure measurements in radial tunnels in a non-flowing well could help to identify horizontal pressure gradients in a reservoir, and hence observe tilted fluid contacts. The equipment used to install the sensors and the sensors themselves are similar to those used in and described with respect to the previous embodiment.

According to another embodiment geophones are installed in the microborehole for permanent seismic monitoring. Measurements from the geophones can be used for a variety of purposes including passive seismic monitoring of reservoir behavior, mapping of hydraulic fracture geometry; and repeat surveys with very constant sensor positioning. The sensors are preferably positioned away from the wellbore which considerably reduces the flow noise that they will measure. According to the invention, sensors can be installed in multiple laterals in opposing directions which provides enough aperture to use arrival time difference to determine source direction (3 laterals, or 2 laterals and a geophone in the main borehole are needed to make this unambiguous). Advantageously, the use of geophones in laterals, and in a main borehole makes a 2D geophone array possible—with a consequent increase in 3D azimuthal resolution. Suitable geophone arrays include the 0.5 inch geophone array and 0.875 inch accelerometer array which have been developed by Los Alamos Labs (See, Oil and Gas Journal, Jan. 10,2000). Additionally, Entran make miniature accelerometers with diameters as low as 3.4 mm that could be used in some application where sensitivity is less critical. Alternatively, XLTL have proposed to use intelligent coiled tubing drilling to emplace arrays of permanent geophones in designer boreholes. According to the invention, the technology developed for dedicated seismic boreholes, is adapted for use in microboreholes.

According to another embodiment, geophones or other sensors are installed in microboreholes to improve the geometry for look-ahead technologies. Conventional look-ahead methods rely on sources and sensors on the drillstring, which suffer from noise, the presence of borehole modes, and the requirement that waves must be scattered in the right direction from features ahead of or around the bit. Placing sensors in microlaterals near the drillface advantageously reduces the drilling or production noise that they experience, eliminates or greatly reduces borehole modes, and improves the geometry. By providing a suitable power supply, sources such as piezoelectric transducers or electric hammers can also be sited in microlaterals.

According to another embodiment, formation fluid sampling is provided with reduced contamination. Conventionally, much of the time spent with sampling tools such as Schlumberger's Modular Downhole Tool (MDT) is aimed at acquiring a hydrocarbon sample free of contamination by drilling fluid filtrate. Since the main borehole is drilled over a long timescale, with dynamic filtration over most of that time, filtrate invasion is deep, and a good deal of fluid must be sucked out of the formation before a clean sample can be obtained. According to the invention, microlaterals are drilled rapidly, and are then subject to static filtration conditions. A sampling probe inserted at the end of a 2 meter microlateral advantageously avoids the filtrate generated by the drilling of the main borehole, and generates much less filtrate by itself. Sampling using this embodiment is thereby provided in a much quicker and cleaner fashion.

According to another embodiment, gas or water monitors in horizontal wells are provided. Drilling a set of microlaterals downwards from a horizontal well allows installation of water detectors (e.g., conductivity or dielectric sensors) 2 or 3 meters away from the main borehole, advantageously giving an early and precise warning of the onset of coning or other water movements, and allowing timely control of the production profile in the well to maximize recovery. Microlaterals drilled upwards, with gas detectors (chemical or acoustic, say), provide similar advantages in the case of gas cap encroachment. The environment for the sensors is clean, undisturbed by cementing or other wellbore operations, and the positioning of the sensors is optimal. Conductivity and dielectric sensors for water are commonplace technology. Gas detection is preferably performed by attenuation or travel time of an acoustic pulse in the microborehole, generated and detected by acoustic transducers. Conventional devices such as those used by Schlumberger are preferably used.

According to another embodiment, micrologging is provided in microboreholes drilled from horizontal wells. A resistivity logging tool is coupled to the rock bit as it drills the microlateral. Using the resistivity logging tool, a log of the formation variation perpendicular to the main borehole can advantageously be acquired. In a horizontal well, a microlateral upwards or downwards will in this way generate valuable information about the geological environment of the well; for example, where the main borehole lies in relation to a highly permeable payzone. According to a variation of this embodiment, a miniature logging tool is inserted in the hole the microlateral has drilled. It is known using the Schlumberger Cased Hole Dynamics Tester to mount a pressure sensor on the drilling assembly. See web-brochure incorporated by reference above. This type of arrangement is preferably used to carry out the present embodiment with suitable modification for resistivity logging instead of pressure sensing.

According to another embodiment of the invention, tracers are injected in the rock formation in microlaterals. Injection of a tracer in one main well and detection of the tracer in a separate main well is often regarded as an important validation for flow models. According to this embodiment of the invention a tracer is injected in a microlateral at a very precise location within a sequence of permeable intervals, to allow very accurate delineation of flow pathways. This embodiment is especially useful in thinly bedded reservoirs, or reservoirs with thin baffles or conduits. Preferably, tracers are injected in an array of holes to allow the tracer injection to be made at a variety of azimuthal locations around the well. An azimuthally controlled tracer injection could in some circumstances advantageously provide information additional to that from standard, all-azimuth, injection. Preferably a injection tool is provided that can run in the main borehole and inject fluid into individual microlaterals. The tracers are detected in microlaterals using a chemical sensor tailored to the tracer material and is suitably sized to sense the tracer from within a microlateral.

According to another embodiment of the invention, fractured reservoir or individual fracture characterization is provided using microlaterals. A fracture detection log is run in a microlateral, drilled in a fractured reservoir environment. This technique advantageously is used to resolve ambiguity in the geometry and properties of a natural fracture or fracture network inferred from measurements along the main borehole alone. For example, if drilling laterally from a horizontal well showed the presence within 1 or 2 meters of a major fracture, the well can be steered either to intersect it or to avoid it, according to the suspected long distance fluid flow characteristics of the fracture. Similarly, because few vertical fractures are intersected by vertical pilot holes, running fracture detection logs in a plurality of azimuthally distributed microlaterals is used to determine the kick-off direction for the lateral section. Preferably, the imaging technologies conventionally used for fracture detection are modified for use in the smaller diameter microlateral. One example of imaging technology that could be used with the present embodiment is the borehole viewer for use in holes as small as 50 mm diameter developed by TNO in Delft.

According to another embodiment of the invention compaction monitoring is provided using microlaterals. The compaction of soft reservoirs (e.g., chalks) are conventionally monitored by shooting highly radioactive bullets behind the casing, then running a detection tool to observe the slow movement of peaks in the radiation profile. This is expensive, relatively inaccurate and unpopular because of the radioactive material involved. It also does not work in horizontal wells, because the direction of movement of the bullets is perpendicular to the wellbore. According to this embodiment of the invention, microlaterals are drilled up and down from a horizontal well, and relatively simple extensometers are installed that directly measure the movements of the formation. Highly sensitive borehole extensometers such as those used in small holes in the tunneling and mining industries are preferably used for the present embodiment. For example, see the range of extensometers made by RST Instruments.

According to another embodiment, tilt measurement for hydraulic fracture monitoring or differential compaction monitoring is provided using microlaterals. Companies such as Pinnacle currently offer monitoring of hydraulic fracture geometry by measurement of tilts during pumping, and inversion of the resulting tilt field. The tiltmeters are either at the surface (where the sensitivity decreases with depth of the treatment), or in an offset well (which is operationally more complex). According to this embodiment of the invention, a tiltmeter is installed in a microlateral of the well being fractured, with a large enough offset from the well to see the effects of a moderately sized frac treatment. Similarly, in fields where production results in reservoir compaction or may trigger tectonic movement, tiltmeter installation can complement compaction monitoring to give a larger picture of the strain field in the well-bore vicinity. Tiltmeters such as those available from RST (and other geotechnical companies) are preferably modified for use in microlateral hole sizes.

According to a number of embodiments of the invention, various other sensors—electroseismic, streaming potential, temperature, magnetic field and chemical are installed in microlaterals. Preferably, such sensors are installed permanently in the relatively clean and quiet environment of a microlateral. The placement of such sensors in a microlateral also advantageously provides investigation along directions other than that of the main borehole, e.g., to map azimuthal variations of properties around the main borehole. For chemical sensors in particular, the microlateral offers a much cleaner environment, where the sensed fluid has not encountered wellbore fluids. Preferably a large number of multilaterals are drilled at a single location, e.g., like the spokes of a wheel, so wide baselines and azimuthal sensitivity to signals (e.g., tracer arrival) are made possible. Temperature sensors (for example, platinum resistance devices, thermocouples) are in conventional use and can be made extremely small for used in microlaterals, as can chemical sensors. For example, see UK Patent Application No. 0217249.2, Filed 25 Jul. 2002.

According to another embodiment, monitoring behind expandable tubulars is provided using microlaterals. Expandables are intended to conform to the wellbore shape, so fitting sensors behind them requires extra space. Microlaterals provide the needed space. Preferably, sensors such as those described in the other embodiments of the invention are provided behind an expandable tubular.

According to another embodiment, single interval flowmeters are provided using microlaterals. Since the microlaterals are clean and smooth, flow measurements are made within them, using, for example, MEMS transducers. Placing a microlateral instrumented in this way in each of a number of producing zones (together with perforations for bulk production) allows the contributions of individual zones to be monitored, and allows the effects of a waterflood or other remote treatments to be evaluated in much greater detail (e.g., to tell whether all of a waterflood's effectiveness is in a single interval only).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A system for making measurements associated with a rock formation comprising:
    a main borehole;
    a microborehole extending from the main borehole into the rock formation;
    a sensing device positioned and arranged to make a measurement at a measurement zone being located in the microborehole away from the main borehole by a distance of at least the diameter of the main borehole; and
    a packer installed in the microborehole dimensioned and arranged to hydraulically isolate the measurement zone from conditions present in other parts of the microborehole and/or main borehole.

2. The system of claim 1 wherein the sensing device is a pressure sensor.

3. The system of claim 2 wherein the sensing device is a pore pressure sensor.

4. The system of claim 3 wherein the rock formation is a shale formation.

5. The system of claim 2 further comprising:
    a second sensing device positioned and arranged to make a measurement at a second measurement zone being located in the microborehole; and
    a second packer installed in the microborehole dimensioned and arranged to hydraulically isolate the second measurement zone from conditions present in other parts of the microborehole.

6. The system of claim 1 wherein the sensing device is a water sensor adapted to detect the presence of water in the measurement zone.

7. The system of claim 1 wherein the sensing device is a gas sensor adapted to detect the presence of gas in the measurement zone.

8. The system of claim 1 wherein the sensing device is an electrical sensor adapted to detect electroseismic activity based on measurement of an electromagnetic field in the measurement zone.

9. The system of claim 1 wherein the sensing device is a streaming potential sensor.

10. The system of claim 1 wherein the sensing device is a temperature sensor adapted to detect the temperature in the measurement zone.

11. The system of claim 1 wherein the sensing device is a chemical sensor.

12. The system of claim 1 wherein the microborehole is at least one meter long and the measurement zone is at least one meter away from the main borehole.

13. The system of claim 12 wherein the microborehole is at least two meters long and the measurement zone is at least two meters away from the main borehole.

14. A system for making measurements associated with a rock formation comprising:
    a main borehole;
    a microborehole extending from the main borehole into the rock formation; and
    a sensing device at least part of which is positioned in the microborehole away from the main borehole by a distance at least the diameter of the main borehole,
        wherein multiple measurements are made along length of microborehole using at least the sensing device,
        wherein the sensing device is moveable along the microborehole and the multiple measurements are made using the sensing device at a plurality of positions within the microborehole, and wherein the sensing device is an ultrasonic imaging device adapted to characterize one or more fractures in the rock formation.

15. A system for making measurements associated with a rock formation comprising:

a main borehole;

a microborehole extending from the main borehole into the rock formation; and a sensing device at least part of which is positioned in the microborehole away from the main borehole by a distance at least the diameter of the main borehole, wherein the sensing device is a flowmeter.

16. A method of installing a sensor in a rock formation comprising the steps of:

drilling a main borehole;

drilling a microborehole extending from the main borehole into the rock formation;

positioning a sensing device in the microborehole so as to make a measurement at a measurement zone being located in the microborehole away from the main borehole by a distance of at least the diameter of the main borehole; and installing a packer in the microborehole to hydraulically isolate the measurement zone from conditions present in other parts of the microborehole and/or main borehole.

17. The method of claim 16 wherein the sensing device is a pressure sensor.

18. The method of claim 16 further comprising:

positioning a second sensing device in the microborehole so as to make a measurement at a second measurement zone being located in the microborehole; and installing a second packer in the microborehole to hydraulically isolate the second measurement zone from conditions present in other parts of the microborehole.

19. The method of claim 16 wherein the sensing device is selected from a group consisting of a gas sensor, a water sensor, an electroseismic sensor, a steaming potential sensor, a temperature sensor and a chemical sensor.

* * * * *